United States Patent
Min et al.

(10) Patent No.: US 11,457,162 B2
(45) Date of Patent: Sep. 27, 2022

(54) LOCAL TONE MAPPING CIRCUIT, IMAGE SENSING DEVICE AND OPERATION METHOD OF THE SAME

(71) Applicant: SK hynix Inc., Gyeonggi-do (KR)

(72) Inventors: Chang Ki Min, Gyeonggi-do (KR); Jin Su Kim, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 136 days.

(21) Appl. No.: 17/089,204

(22) Filed: Nov. 4, 2020

(65) Prior Publication Data

US 2021/0360178 A1 Nov. 18, 2021

(30) Foreign Application Priority Data

May 18, 2020 (KR) .................. 10-2020-0059164

(51) Int. Cl.
| | | |
|---|---|---|
| *H04N 5/355* | (2011.01) | |
| *G06T 5/00* | (2006.01) | |
| *G06T 5/20* | (2006.01) | |
| *H04N 9/04* | (2006.01) | |
| *H04N 5/369* | (2011.01) | |

(Continued)

(52) U.S. Cl.
CPC ............ *H04N 5/355* (2013.01); *G06T 5/008* (2013.01); *G06T 5/20* (2013.01); *G06T 2207/10004* (2013.01)

(58) Field of Classification Search
CPC ........ H04N 5/355; H04N 9/045; H04N 9/643; H04N 5/2355; G06T 5/008; G06T 5/20; G06T 5/009

See application file for complete search history.

(56) References Cited

U.S. PATENT DOCUMENTS

| | | | |
|---|---|---|---|
| 2018/0012339 A1* | 1/2018 | Puetter | G06T 5/008 |
| 2019/0222866 A1* | 7/2019 | Song | H04N 19/105 |
| 2021/0264579 A1* | 8/2021 | Gresset | G06T 5/008 |

FOREIGN PATENT DOCUMENTS

| | | |
|---|---|---|
| KR | 10-1754425 | 7/2017 |
| KR | 10-1931466 | 12/2018 |

OTHER PUBLICATIONS

Ahn et al., Adaptive Local Tone Mapping Based on Retinex for High Dynamic Range Images, 2013 IEEE International Conference on Consumer Electronics (ICCE), 2013, pp. 153-156, IEEE, Las Vegas, NV, USA.

* cited by examiner

*Primary Examiner* — Christopher K Peterson
(74) *Attorney, Agent, or Firm* — IP & T Group LLP (57) ABSTRACT

A local tone mapping circuit includes an average value calculation unit suitable for calculating an average value of an absolute value of a difference between a center pixel data and a neighboring pixel data of the center pixel data; a range calculation unit suitable for calculating a range between a maximum value and a minimum value of the absolute value of a difference between the center pixel data and the neighboring pixel data; and a local tone mapping strength adjusting unit suitable for differently allocating a weighted value according to a distance between a center pixel and an edge pixel among neighboring pixels of the center pixel based on the range between the maximum value and the minimum value calculated by the range calculation unit and the average value calculated by the average value calculation unit, and adjusting a local tone mapping strength according to an allocated weighted value.

16 Claims, 6 Drawing Sheets

(51) Int. Cl.
*H04N 9/64* (2006.01)
*H04N 5/235* (2006.01)

LOCAL TONE MAPPING CIRCUIT, IMAGE SENSING DEVICE AND OPERATION METHOD OF THE SAME

CROSS-REFERENCE TO RELATED APPLICATION

This patent application claims priority to Korean Patent Application No. 10-2020-0059164, filed on May 18, 2020, which is herein incorporated by reference in its entirety.

TECHNICAL FIELD

Various embodiments of the present invention generally relate to a semiconductor device. Particularly, various embodiments relate to a local tone mapping circuit, an image sensing device and an operation method of the same.

BACKGROUND

Recently, the computer environment paradigm has shifted to ubiquitous computing, which enables a computer system to be used virtually anytime and everywhere. As a result, use of portable electronic devices such as mobile phones, digital cameras, notebook computers and the like has been rapidly increasing.

Recently, due to the rapid development of display devices, the development of image photographing devices having image sensors, such as cameras and camcorders, has been accelerated. The image photographing devices can photograph an image and record the photographed image in a recording medium, and simultaneously reproduce the image at any time. Accordingly, as the number of users of image photographing devices has increased, the demand for more functionality in the image photographing device has also increased. Specifically, more functionality for high capability and multi-functions, in addition to a compact size, a reduced weight, and lower power consumption of the image photographing device is desirable.

SUMMARY

Embodiments of the present invention are directed to a local tone mapping circuit, an image sensing device and an operation method of the same, capable of reducing a distortion phenomenon. The distortion phenomenon may be, for example, a halo artifact which may occur in a local tone mapping operation. The operation may use an average value of an absolute value of a difference between a center pixel data among pixel data outputted from a pixel array including a plurality of pixels and a neighboring pixel data of the center pixel data.

In an embodiment, a local tone mapping circuit may include an average value calculation circuit suitable for calculating an average value of absolute values of differences between center pixel data in a corresponding kernel of a pixel array and neighboring pixel data of the center pixel data, among pixel data outputted from the pixel array including a plurality of pixels; a range calculation circuit suitable for calculating a range between a maximum value and a minimum value of the absolute values; and a local tone mapping strength adjusting circuit suitable for allocating a weighted value to the pixel data according to a distance between a center pixel and an edge pixel among neighboring pixels of the center pixel based on the range and the average value, and adjusting a local tone mapping strength according to an allocated weighted value.

The local tone mapping strength adjusting circuit may set the weighted value based on a set threshold value according to the distance between the center pixel and the edge pixel. The weighted value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

The local tone mapping strength adjusting circuit may decrease the local tone mapping strength when the range is greater than a set value and the average value is less than the set value.

The local tone mapping strength adjusting circuit may increase the local tone mapping strength when the range is less than a set value and the average value is greater than the set value.

In another embodiment, an image sensing device may include an image sensor including a pixel array having a plurality of pixels; an image signal processor suitable for processing an output signal of the image sensor; and a local tone mapping circuit including: an average value calculation circuit suitable for calculating an average value of absolute values of differences between center pixel data and neighboring pixel data of the center pixel data, among pixel data outputted from the pixel array; a range calculation circuit suitable for calculating a range between a maximum value and a minimum value of the absolute values; and a local tone mapping strength adjusting circuit suitable for allocating a weighted value to the pixel data according to a distance between a center pixel and an edge pixel among neighboring pixels of the center pixel based on the range and the average value, and adjusting a local tone mapping strength according to an allocated weighted value.

The local tone mapping strength adjusting circuit may set the weighted value based on a set threshold value according to the distance between the center pixel and the edge pixel.

The local tone mapping strength adjusting circuit may set the weighted value based value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

The local tone mapping strength adjusting circuit may decrease the local tone mapping strength when the range is greater than a set value and the average value is less than the set value.

The local tone mapping strength adjusting circuit may increase the local tone mapping strength when the range is less than a set value and the average value is greater than the set value.

In another embodiment, an operation method of an image sensing device may include calculating an average value of absolute values of differences between center pixel data and neighboring pixel data of the center pixel data among pixel data outputted from a pixel array including a plurality of pixels; calculating a range between a maximum value and a minimum value of the absolute values; allocating a weighted value to pixel data according to a distance between a center pixel and an edge pixel among neighboring pixels of the center pixel based on the range and the average value; and adjusting a local tone mapping strength according to an allocated weighted value.

The allocating of the weighted value may include setting the weighted value based on a set threshold value according to the distance between the center pixel and the edge pixel.

The weighted value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

The adjusting of the local tone mapping strength may include decreasing the local tone mapping strength when the range is greater than a set value and the average value is less than the set value.

The adjusting of the local tone mapping strength may include increasing the local tone mapping strength when the range is less than a set value and the average value is greater than the set value.

In another embodiment, an image sensing device may include an image sensor including a pixel array having a plurality of pixels; and a local tone mapping circuit suitable for: receiving pixel data from the pixel array, the pixel data including a plurality of pixel elements in a set kernel; calculating absolute values of differences between a center pixel item and each of neighboring pixel items adjacent to the center pixel item, among the plurality of pixel elements; allocating a weighted value for the center pixel item, based on a range between a maximum value and a minimum value of the absolute values and an average value of the absolute values; and adjusting a local tone mapping strength for the center pixel item according to the weighted value.

These and other features and advantages of the present invention will become understood by those with ordinary skill in the art of the present invention from the following drawings and detailed description.

BRIEF DESCRIPTION OF THE DRAWINGS

The description herein makes reference to the accompanying drawings wherein like reference numerals refer to like parts throughout the several views.

DETAILED DESCRIPTION

Various examples of the present invention are described below in more detail with reference to the accompanying drawings. The invention may be realized in other embodiments, forms and variations thereof and should not be construed as being limited to the embodiments set forth herein. Rather, the described embodiments are provided so that this present invention is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present invention are described in detail with reference to the accompanied drawings.

Figure 1:
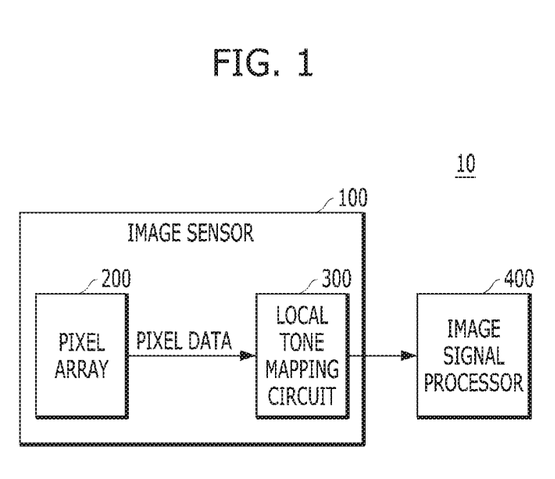
FIG. 1 is a block diagram illustrating an image sensing device employing a local tone mapping circuit in accordance with an embodiment of the present invention.

FIG. 1 is a block diagram illustrating an image sensing device 10 in accordance with an embodiment of the present invention.

Referring to FIG. 1, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, an internet of things (IoT), or an internet of everything (IoE).

The image sensor 100 may include a pixel array 200 and a local tone mapping circuit 300.

The pixel array 200 may include a plurality of pixels. Herein, the pixel may represent a pixel data, and have RGB data format, YUV data format or YCbCr data format. It is noted, however, that the present invention is not limited to the aforementioned data formats.

The local tone mapping circuit 300 may calculate an average value of absolute values of differences between a center pixel data and neighboring pixel data, among pixel data outputted from the pixel array 200. Further, the local tone mapping circuit 300 may calculate a range between a maximum value and a minimum value of the absolute values of differences between the center pixel data and the neighboring pixel data, and adjust a local tone mapping strength based on a weighted value that is allocated according to a distance between the center pixel and an edge pixel among the neighboring pixel of the center pixel.

Figure 3:
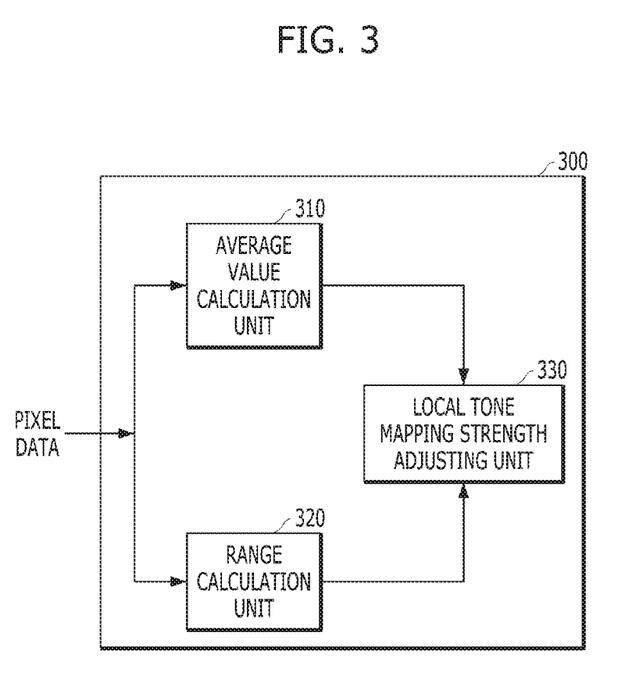
FIG. 3 is a block diagram illustrating a local tone mapping circuit in accordance with an embodiment of the present invention.
Figure 4:
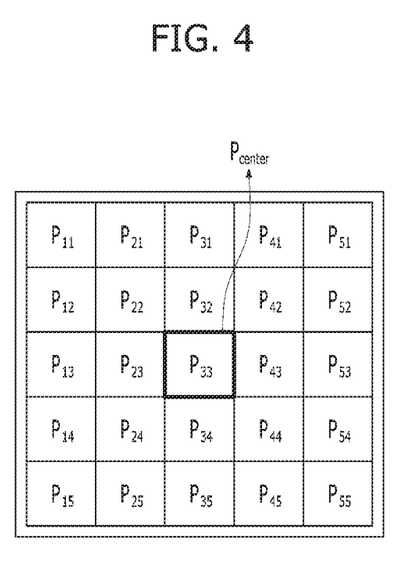
FIG. 4 is a diagram illustrating a kernel of 5×5 pixel size in the local tone mapping circuit shown in FIG. 3.
Figure 5:
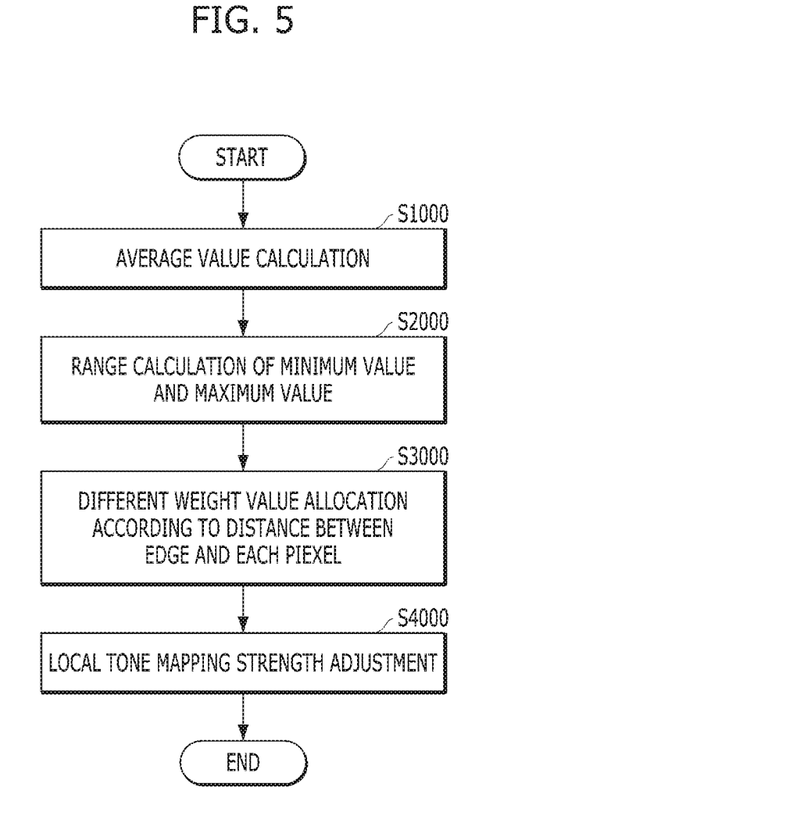
FIG. 5 is a flow chart illustrating an operation of an image sensing device in accordance with an embodiment of the present invention.

The local tone mapping circuit 300 may be implemented as shown in FIGS. 3 to 5.

The detailed configuration and operations of the local tone mapping circuit 300 will be described in detail later with reference to FIGS. 3 to 5.

The image signal processor 400 may be implemented in an integrated circuit, a system on chip (SoC) or a mobile application processor. The image signal processor 400 may process an output signal of the image sensor 100. That is, the image signal processor 400 may receive and process an image output signal outputted from the local tone mapping circuit 300 of the image sensor 100.

More specifically, the image signal processor 400 may generate RGB image data from a Bayer pattern corresponding to a pixel data. For example, the image signal processor 400 may process a Bayer pattern such that the image data is displayed in a display, and may transfer a processed image data to an interface.

In an embodiment, each of the image sensor 100 and the image signal processor 400 may be implemented as a multi-chip package (MCP). In another embodiment, the image sensor 100 and the image signal processor 400 may be implemented as a single chip.

Figure 2:
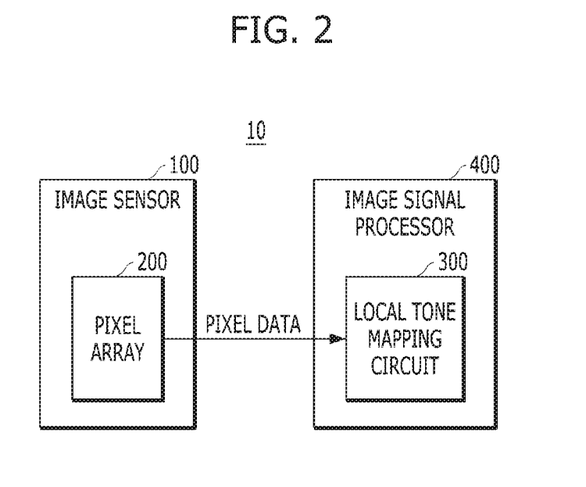
FIG. 2 is a block diagram illustrating an image sensing device employing a local tone mapping circuit in accordance with an embodiment of the present invention.

FIG. 2 is a block diagram illustrating an image sensing device 10 in accordance with an embodiment of the present invention.

Referring to FIG. 2, the image sensing device 10 may include an image sensor 100 and an image signal processor (ISP) 400. The image signal processor 400 may include a local tone mapping circuit 300.

The local tone mapping circuit 300 may be implemented as shown in FIGS. 3 to 5.

The structure and operation of the image sensing device 10 shown in FIG. 2 are substantially same as the structure and operation of the image sensing device 10 shown in FIG. 1 except that the local tone mapping circuit 300 is implemented not inside the image sensor 100 but in the image signal processor 400. Thus, detailed descriptions of the image sensor device 10 of FIG. 2 may be omitted.

Hereinafter, the local tone mapping circuit 300 is described with reference to FIGS. 3 to 5.

FIG. 3 is a block diagram illustrating a local tone mapping circuit 300 in accordance with an embodiment of the present invention. FIG. 4 is a diagram illustrating a kernel of 5×5 pixel size in the local tone mapping circuit 300 shown in FIG. 3. FIG. 5 is a flow chart illustrating an operation of an image sensing device in accordance with an embodiment of the present invention.

Referring to FIG. 3, the local tone mapping circuit 300 may include an average value calculation circuit 310, a range calculation circuit 320 and a local tone mapping strength adjusting circuit 330.

The average value calculation circuit 310 may calculate an average value of absolute values of differences between a center pixel data $P_{center}$ (e.g., $P_{33}$ of FIG. 4) and neighboring pixel data (e.g., $P_{11}$ to $P_{55}$ excluding $P_{33}$ in FIG. 4) adjacent to the center pixel data, among pixel data outputted from a pixel array including a plurality of pixels.

Herein, the average value of absolute values of differences between a center pixel data $P_{center}$ and the neighboring pixel data $P_{11}$ to $P_{55}$ may be calculated according to equation 1.

$$\text{dis\_aver} = \frac{1}{N} \sum_{x,y}^{N} \text{abs}(P_{center} - P_{x,y}), \qquad \text{[equation 1]}$$

where 'dif_aver' denotes the average value of the absolute values of the differences between the center pixel data and the neighboring pixel data, 'N' denotes a kernel size, 'abs($P_{center}-P_{x,y}$)' denotes the absolute value of the difference between the center pixel data and one of the neighboring pixel data, '$P_{center}$' denotes pixel data located in a center pixel of the kernel having size (n×n) and '$P_{x,y}$' denotes pixel data of coordinate (x,y) in the kernel having size (n×n).

In the embodiment of the present invention, 'N' may be '5', and '$P_{x,y}$' denotes pixel data corresponding to $P_{11}$ to $P_{55}$ in the kernel having size (5×5).

The range calculation circuit 320 may calculate a range between a maximum value and a minimum value of the absolute values of differences between the center pixel data $P_{center}$ and the neighboring pixel data $P_{11}$ to $P_{55}$.

Herein, the range between a maximum value and a minimum value of the absolute values of differences between the center pixel data $P_{center}$ and the neighboring pixel data $P_{11}$ to $P_{55}$ may be calculated according to equation 2.

$$\text{dif\_max} = \max(\text{abs}(P_{center}-P_{x,y}))$$

$$\text{dif\_min} = \min(\text{abs}(P_{center}-P_{x,y})), \quad \text{[equation 2]}$$

where 'dif_max' denotes the maximum value of the absolute values of the differences between the center pixel data and the neighboring pixel data, 'dif_min' denotes the minimum value of the absolute values of the differences between the center pixel data and the neighboring pixel data, 'abs($P_{center}-P_{x,y}$)' denotes the absolute values of the differences between the center pixel data and the neighboring pixel data, '$P_{center}$' denotes pixel data located in a center pixel of the kernel having size (n×n) and '$P_{x,y}$' denotes pixel data of coordinate (x,y) in the kernel having size (n×n).

The local tone mapping strength adjusting circuit 330 may differently allocate a weighted value to the pixel data according to a distance between the center pixel and an edge pixel among neighboring pixels of the center pixel in a corresponding kernel based on the range between the maximum value and the minimum value calculated by the range calculation circuit 320 and the average value calculated by the average value calculation circuit 310. Further, the local tone mapping strength adjusting circuit 330 may adjust a local tone mapping strength according to an allocated weighted value.

Herein, the allocated weighted value may be calculated according to equation 3.

$$dweight = \frac{\text{dif\_aver} - \text{dif\_min}}{\text{dif\_max} - \text{dif\_min}} \quad \text{[equation 3]}$$

where 'dweight' denotes a weighted value according to a distance between center pixel and the edge pixel among the neighboring pixels of the center pixel in a kernel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

Also, the local tone mapping strength adjusting circuit 330 may set the weighted value to the pixel data based on a predetermined threshold value according to the distance between center pixel and the edge pixel among the neighboring pixels of the center pixel.

The local tone mapping strength adjusting circuit 330 may decrease the local tone mapping strength when the range between the maximum value and the minimum value of the absolute values of the differences between the center pixel data $P_{center}$ and the neighboring pixel data $P_{11}$ to $P_{55}$ is greater than a predetermined value and the average value of the absolute values of the differences between the center pixel data $P_{center}$ and the neighboring pixel data $P_{11}$ to $P_{55}$ is less than the predetermined value. Herein it may be determined that the edge pixel and the corresponding pixel are arranged relatively far apart from each other. If the local tone mapping strength is decreased, an influence of an edge pixel image data on a low frequency may be reduced.

The local tone mapping strength adjusting circuit 330 may increase the local tone mapping strength when the range between the maximum value and the minimum value of the absolute values of the differences between the center pixel data $P_{center}$ and the neighboring pixel data $P_{11}$ to $P_{55}$ is less than a predetermined value and the average value of the absolute values of the differences between the center pixel data $P_{center}$ and the neighboring pixel data $P_{11}$ to $P_{55}$ is greater than the predetermined value. Herein it may be determined that the edge pixel and the neighboring pixel data $P_{11}$ to $P_{55}$ are arranged to be relatively close to each other. Thus, it is possible to prevent a distortion phenomenon such as a halo artifact from spreading widely.

Hereinafter, an operation of an image sensing device in accordance with an embodiment of the present invention will be described with reference to FIG. 5. FIG. 5 is a flow chart illustrating an operation of an image sensing device (e.g., an image sensing device 10 in FIGS. 1 and 2) in accordance with an embodiment of the present invention.

Referring to FIG. 5, an operation of an image sensing device in accordance with another embodiment of the present invention may include an average value calculation operation S1000, a range calculation operation S2000, a weighted value allocation operation S3000 and a local tone mapping strength adjusting operation S4000.

At the operation S1000, an average value of absolute values of differences between a center pixel data $P_{center}$ and a neighboring pixel data $P_{11}$ to $P_{55}$ of the center pixel data $P_{center}$ among pixel data outputted from a pixel array including a plurality of pixels may be calculated.

Herein, the average value of the absolute values of the differences between the center pixel data $P_{center}$ and the neighboring pixel data $P_{11}$ to $P_{55}$ may be calculated according to equation 1.

At the operation S2000, a range between a maximum value and a minimum value of the absolute values of differences between the center pixel data $P_{center}$ and the neighboring pixel data $P_{11}$ to $P_{55}$ may be calculated.

Herein, the range between the maximum value and the minimum value of the absolute values of the differences between the center pixel data $P_{center}$ and the neighboring pixel data $P_{11}$ to $P_{55}$ may be calculated according to equation 2.

At the operation S3000, a weighted value according to a distance between center pixel and an edge pixel may be differently allocated based on the range between the maximum value and the minimum value, which are calculated at the operation S2000, and the average value, which is calculated at the operation S1000.

Herein, the weighted value according to the distance between the center pixel and the edge pixel may be allocated according to equation 3.

At the operation S4000, the local tone mapping strength may be adjusted according to the weighted value which is differently allocated.

When the range between the maximum value and the minimum value of the absolute values of the differences between the center pixel data and the neighboring pixel data is greater than a set value and the average value of the absolute values of the differences between the center pixel data and the neighboring pixel data is less than the set value, the local tone mapping strength may be decreased.

When the range between the maximum value and the minimum value of the absolute values of the differences between the center pixel data and the neighboring pixel data is less than a set value and the average value of the absolute values of the differences between the center pixel data and the neighboring pixel data is greater than the predetermined value, the local tone mapping strength may be increased.

Hereinafter, a system configured to implement an image sensing device in accordance with an embodiment of the present invention is described in detail with reference to FIG. 6.

Figure 6:
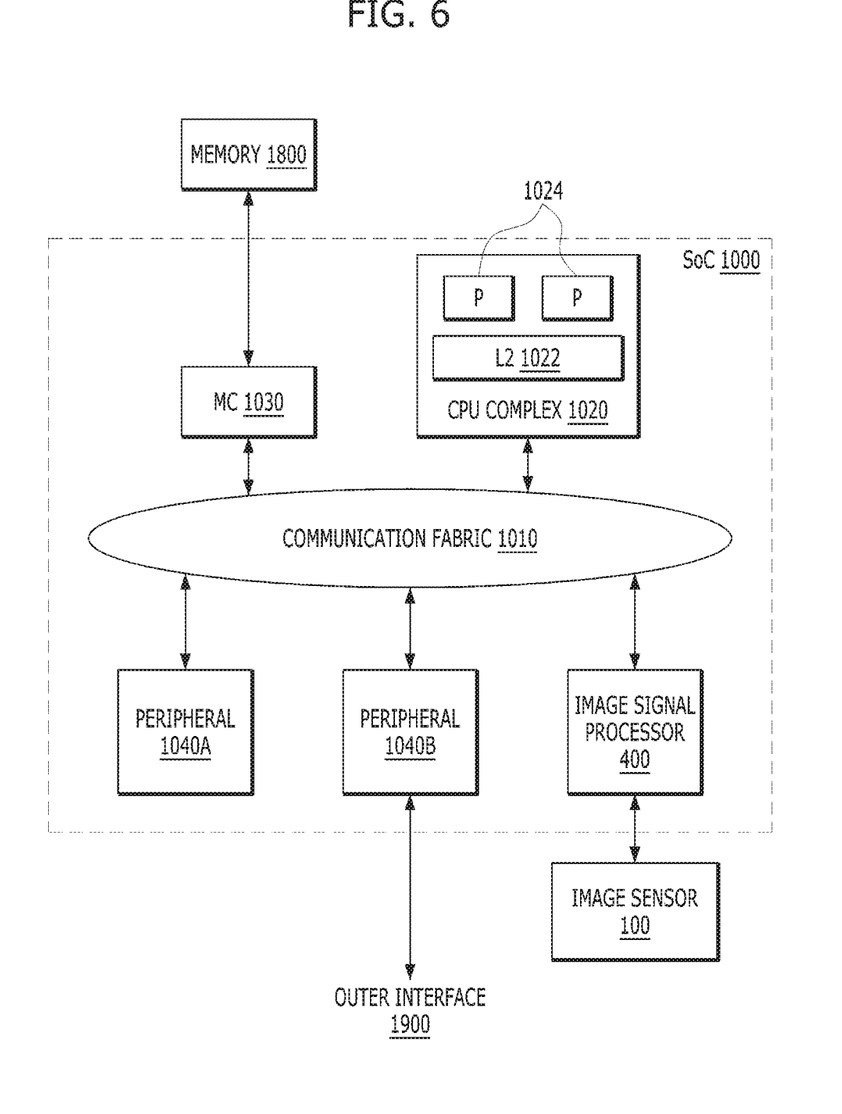
FIG. 6 is a block diagram illustrating a system configured to implement an image sensing device in accordance with an embodiment of the present invention.

FIG. 6 illustrates a system configured to implement an image sensing device in accordance with an embodiment of the present invention.

In various embodiments, the system of FIG. 6 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to an embodiment, the system of FIG. 6 may represent a system-on-a-chip (SoC). The circuits of the SoC 1000 may be integrated onto a single semiconductor substrate as an integrated circuit "chip." In some embodiments, the circuits may be implemented on two or more discrete chips in a system. The SoC 1000 will be used as an example herein.

In the illustrated embodiment, the circuits of the SoC 1000 include a central processing unit (CPU) complex 1020, on-chip peripheral circuits 1040A-1040B (more briefly, "peripherals"), a memory controller (MC) 1030, a communication fabric 1010, and an image signal processor 400. The SoC 1000 may also be coupled to additional circuits, such as to a memory 1800 and an image sensor 100. The circuits 1020, 1030, 1040A-1040B, and 400 may all be coupled to the communication fabric 1010. The memory controller 1030 may be coupled to the memory 1800, and the peripheral 1040B may be coupled to an external interface 1900. Additionally, the image signal processor 400 may be coupled to the image sensor 100.

The peripherals 1040A-1040B may be any set of additional hardware functionality in the SoC 1000. For example, the peripherals 1040A-1040B may include display controllers configured to display video data on one or more display devices, graphics processing units (GPUs), video encoder/decoders, scalers, rotators, blenders, etc.

The image signal processor 400 may, in some embodiments, be part of another video peripheral configured to process image capture data from the image sensor 100 (or other image sensor). The image signal processor 400 and the image sensor 100 may be configured to implement the image sensor 400 and the image sensor 100 shown in FIGS. 1 to 5.

The peripherals 1040A-1040B may also include audio peripherals such as microphones, speakers, interfaces to microphones and speakers, audio processors, digital signal processors, mixers, etc. The peripherals 1040A-1040B (e.g., the peripheral 1040B) may include peripheral interface controllers for various interfaces 1900 external to the SoC 1000 including interfaces such as Universal Serial Bus (USB), peripheral circuit interconnect (PCI) including PCI Express (PCIe serial and parallel ports, etc. The peripherals 1040A-1040B may further include networking peripherals such as media access controllers (MACs). In general, any set of hardware may be included, according to various embodiments.

The CPU complex 1020 may include one or more processors (Ps) 1024 that serve as the CPU of the SoC 1000. The processor(s) 1024 may execute the main control software of the system, such as an operating system. Generally, software executed by the CPU may control the other circuits of the system to realize the desired functionality of the system. The processors 1024 may also execute other software, such as application programs. The application programs may provide user functionality and may rely on the operating system for lower level device control. Accordingly, the processors 1024 may also be referred to as application processors. The CPU complex 1020 may further include other hardware such as the L2 cache 1022 and/or an interface to the other circuits of the system (e.g. an interface to the communication fabric 1010).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other circuits as a system on a chip (SoC 1000) or other levels of integration. Processors may further encompass discrete microprocessors, processor cores and/or microprocessors integrated into multichip module implementations, processors implemented as multiple integrated circuits, etc.

The memory controller 1030 may generally include the circuitry for receiving memory operations from the other circuits of the SoC 1000 and for accessing the memory 1800 to complete the memory operations. The memory controller 1030 may be configured to access any type of memory 1800. For example, the memory 1800 may be a static random access memory (SRAM), or a dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SoC implementations, for example, the memory cache may reduce power consumption in the SoC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain circuits. Additionally, in some embodiments, a system cache need not be located within the memory controller 1030.

In an embodiment, the memory 1800 may be packaged with the SoC 1000 in a chip-on-chip or package-on-package configuration. A multichip module configuration of the SoC 1000 and the memory 1800 may be used as well. Such configurations may be relatively more secure (in terms of data observability) than transmissions to other circuits in the system (e.g. to the end points). Accordingly, protected data may reside in the memory 1800 unencrypted, whereas the protected data may be encrypted for exchange between the SoC 1000 and external endpoints.

The communication fabric 1010 may be any communication interconnect and protocol for communicating among the circuits of the SoC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of circuits of the SoC 1000 (and the number of subcircuits within the CPU complex 1020) may vary from embodiment to embodiment. There may be more or fewer of each circuit/subcircuit than the number shown in FIG. 6, In some embodiments, the methods described herein may be implemented by a computer program product, or software. In some embodiments, a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

As described above, a local tone mapping circuit, an image sensing device and an operation method of the same in accordance with embodiments of the present invention may reduce a distortion phenomenon such as a halo artifact that occurs in a local tone mapping operation using an average value of absolute values of differences between a center pixel data and a neighboring pixel data of the center pixel data among pixel data outputted from a pixel array including a plurality of pixels.

While the present invention illustrates and describes specific embodiments, it will be apparent to those skilled in the art in light of the present invention that various changes and modifications may be made without departing from the spirit and scope of the invention as defined in the following claims. The present invention may encompass all such changes and modifications to the extent they fall within the scope of the claims.

What is claimed is:

1. A local tone mapping circuit, comprising:
an average value calculation circuit suitable for calculating an average value of absolute values of differences between center pixel data in a corresponding kernel of a pixel array and neighboring pixel data of the center pixel data, among pixel data outputted from the pixel array including a plurality of pixels;
a range calculation circuit suitable for calculating a range between a maximum value and a minimum value of the absolute values; and
a local tone mapping strength adjusting circuit suitable for allocating a weighted value to the pixel data according to a distance between a center pixel and an edge pixel among neighboring pixels of the center pixel based on the range and the average value, and adjusting a local tone mapping strength according to an allocated weighted value.

2. The local tone mapping circuit of claim 1, wherein the local tone mapping strength adjusting circuit sets the weighted value based on a set threshold value according to the distance between the center pixel and the edge pixel.

3. The local tone mapping circuit of claim 2, wherein the weighted value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

4. The local tone mapping circuit of claim 1, wherein the local tone mapping strength adjusting circuit decreases the local tone mapping strength when the range is greater than a set value and the average value is less than the set value.

5. The local tone mapping circuit of claim 1, wherein the local tone mapping strength adjusting circuit increases the local tone mapping strength when the range is less than a set value and the average value is greater than the set value.

6. An image sensing device, comprising:
an image sensor including a pixel array having a plurality of pixels;
an image signal processor suitable for processing an output signal of the image sensor; and
a local tone mapping circuit including:
an average value calculation circuit suitable for calculating an average value of absolute values of differences between center pixel data and neighboring pixel data of the center pixel data, among pixel data outputted from the pixel array;
a range calculation circuit suitable for calculating a range between a maximum value and a minimum value of the absolute values; and
a local tone mapping strength adjusting circuit suitable for allocating a weighted value to the pixel data according to a distance between a center pixel and an edge pixel among neighboring pixels of the center pixel based on the range and the average value, and adjusting a local tone mapping strength according to an allocated weighted value.

7. The image sensing device of claim 6, wherein the local tone mapping strength adjusting circuit sets the weighted value based on a set threshold value according to the distance between the center pixel and the edge pixel.

8. The image sensing device of claim 7, wherein the weighted value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

9. The image sensing device of claim 6, wherein the local tone mapping strength adjusting circuit decreases the local tone mapping strength when the range is greater than a set value and the average value is less than the set value.

10. The image sensing device of claim 6, wherein the local tone mapping strength adjusting circuit increases the local tone mapping strength when the range is less than a set value and the average value is greater than the set value.

11. An operation method of an image sensing device, comprising:
calculating an average value of absolute values of differences between center pixel data and neighboring pixel data of the center pixel data among pixel data outputted from a pixel array including a plurality of pixels;
calculating a range between a maximum value and a minimum value of the absolute values;
allocating a weighted value to pixel data according to a distance between a center pixel and an edge pixel among neighboring pixels of the center pixel based on the range and the average value; and
adjusting a local tone mapping strength according to an allocated weighted value.

12. The operation method of claim 11, wherein the allocating of the weighted value includes setting the weighted value based on a set threshold value according to the distance between the center pixel and the edge pixel.

13. The operation method of claim 12, wherein the weighted value is calculated by an equation as below, $$dweight = \frac{dif\_aver - dif\_min}{dif\_max - dif\_min}$$

where 'dweight' denotes a weighted value according to a distance between the center pixel and the edge pixel, 'dif_aver' denotes the average value of the absolute values of the differences between the center pixel data and the neighboring pixel data, 'dif_max' denotes the maximum value of the absolute values of the differences between the center pixel data and the neighboring pixel data, and 'dif_min' denotes the minimum value of the absolute values of the differences between the center pixel data and the neighboring pixel data.

14. The operation method of claim 11, wherein the adjusting of the local tone mapping strength includes decreasing the local tone mapping strength when the range is greater than a set value and the average value is less than the set value.

15. The operation method of claim 11, wherein the adjusting of the local tone mapping strength includes increasing the local tone mapping strength when the range is less than a set value and the average value is greater than the set value.

16. An image sensing device comprising:
an image sensor including a pixel array having a plurality of pixels; and
a local tone mapping circuit suitable for:
receiving pixel data from the pixel array, the pixel data including a plurality of pixel elements in a set kernel;
calculating absolute values of differences between a center pixel item and each of neighboring pixel items adjacent to the center pixel item, among the plurality of pixel elements;
allocating a weighted value for the center pixel item, based on a range between a maximum value and a minimum value of the absolute values and an average value of the absolute values; and
adjusting a local tone mapping strength for the center pixel item according to the weighted value.

* * * * *